United States Patent [19]
Rubin

[11] Patent Number: 5,395,130
[45] Date of Patent: Mar. 7, 1995

[54] BICYCLE BALANCE TRAINER

[76] Inventor: Mary Ann C. Rubin, 678 Laurel Dr., Yardley, Pa. 19067

[21] Appl. No.: 236,322

[22] Filed: Apr. 29, 1994

Related U.S. Application Data

[63] Continuation-in-part of Ser. No. 133,350, Nov. 24, 1993, abandoned.

[51] Int. Cl.⁶ .......................... B62K 9/00; B62K 19/30
[52] U.S. Cl. .................................. 280/304; 280/288.4; 280/293; 267/135
[58] Field of Search ................ 280/293, 288.4, 47.131, 280/755, 298, 299, 300, 304, 292, 213, 204; 267/135, 134

[56] References Cited

U.S. PATENT DOCUMENTS

| 4,917,398 | 4/1990 | de Miranda Pinto | 280/293 |
| 5,028,066 | 7/1991 | Garth | 280/293 X |
| 5,154,096 | 10/1992 | Geller et al | 280/293 X |
| 5,215,037 | 6/1993 | Allred | 280/292 X |
| 5,242,183 | 9/1993 | Oberg et al. | 280/293 |
| 5,303,944 | 4/1994 | Kalmus | 280/288.4 |

FOREIGN PATENT DOCUMENTS

| 2600963 | 1/1988 | France | 280/293 |
| 2668744 | 5/1992 | France | 280/288.4 |
| 2830561 | 1/1980 | Germany | 280/293 |
| 0196520 | 6/1938 | Switzerland | 280/292 |
| 0014880 | of 1903 | United Kingdom | 280/292 |
| 0628992 | 9/1949 | United Kingdom | 280/292 |
| 2238282 | 5/1991 | United Kingdom | 280/288.4 |

Primary Examiner—Margaret A. Focarino
Assistant Examiner—F. Zeender
Attorney, Agent, or Firm—Daniel Kramer

[57] ABSTRACT

An attachment for a two wheeled bicycle allowing a mentor to provide a graduated correcting and stabilizing force to the bicycle for aiding a novice rider to maintain balance and gain confidence. The attachment comprises two substantially parallel rigid tubular members having an inside diameter being fastened to a bicycle frame and a hairpin shaped handle having a resilient connection to the members. The hairpin includes a U-shaped portion having extended straight parallel limbs. The end of each straight limb is connected to a spring-like bendable element which is inserted partly or fully into the tubular members. The spring-like elements have a sliding interference fit within the interior of the tubular members. The U-shaped handle allows gripping by the mentor who adjusts the degree of correcting and stabilizing force provided by the attachment by moving the spring-like bendable elements further into the tubular members, thereby reducing the available flexing length for greater stabilizing force or by partially withdrawing the spring-like bendable elements from the tubular members, thereby increasing the available flexing length, for reduced stabilizing force. A locking device is provided to retain the straight sections of the U-shaped handle when fully inserted into the tubular members.

4 Claims, 2 Drawing Sheets

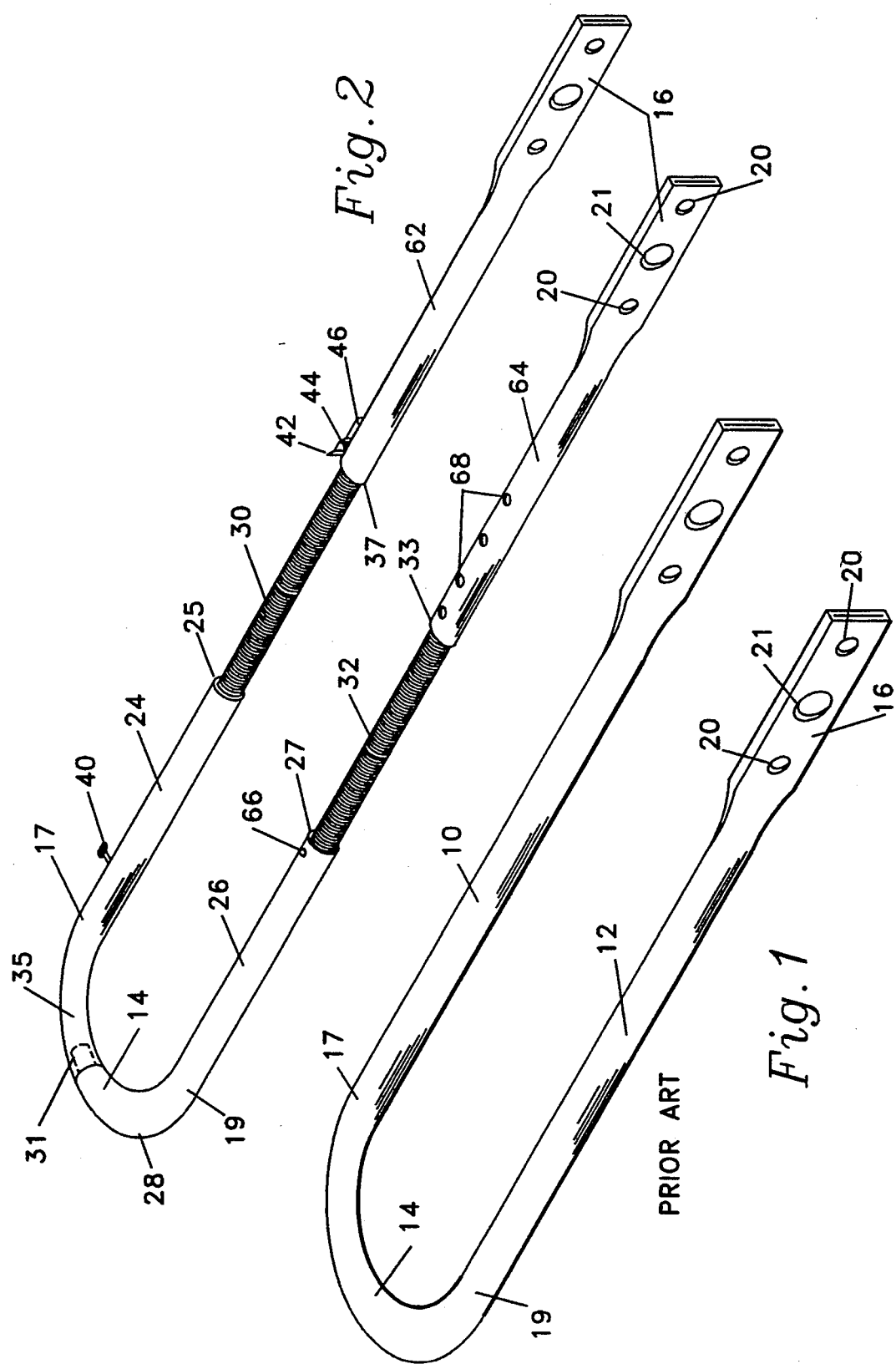

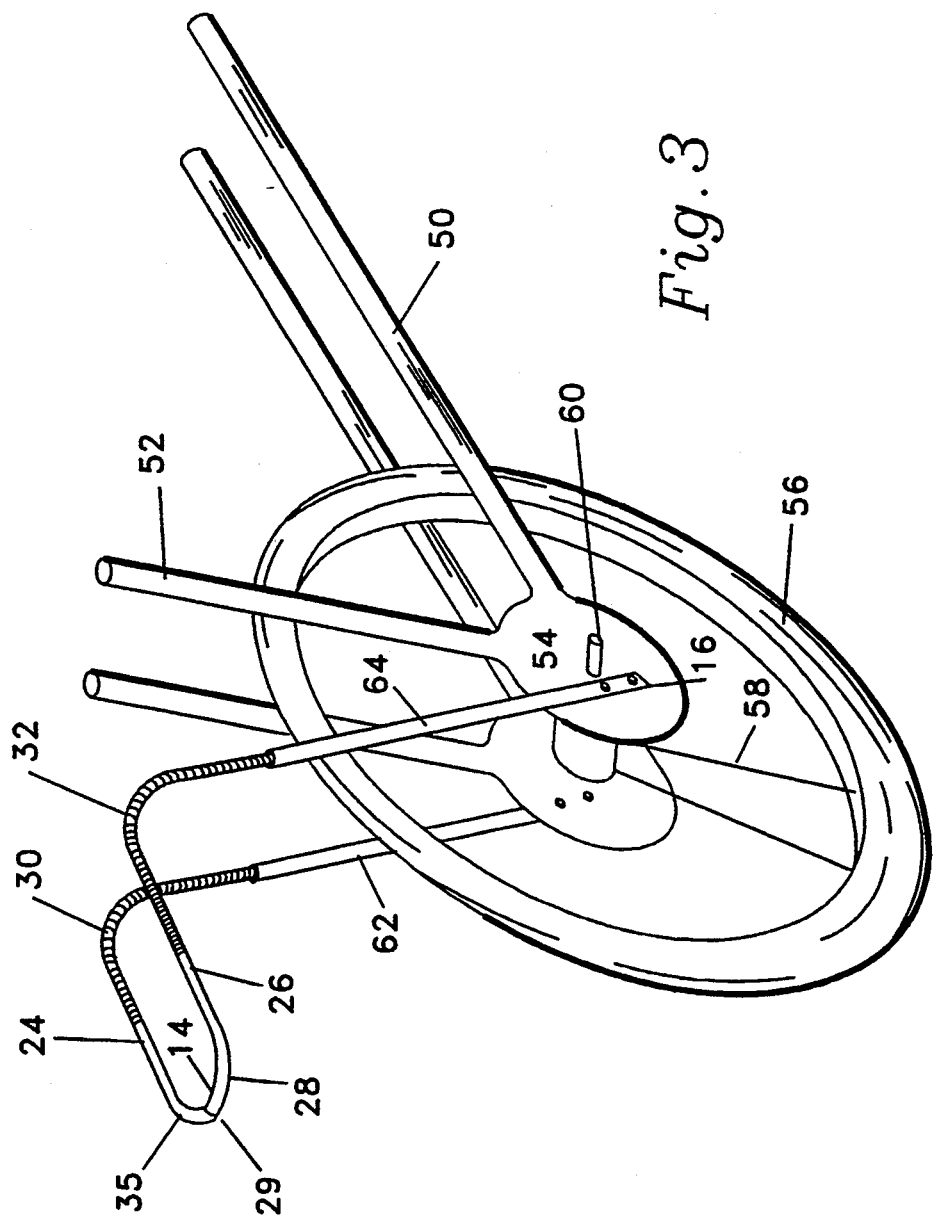

BICYCLE BALANCE TRAINER

REFERENCE TO RELATED APPLICATION

This application is a continuation-in-part of my application for U.S. patent, filed Nov. 24, 1993 and bearing Ser. No. 08/133,350, now abandoned.

FIELD OF THE INVENTION

This invention is related to bicycles. It is further related to appliances and attachments which enable a mentor to facilitate and hasten the learning process by which a novice learns to ride on and balance herself on a two-wheeled bicycle.

1. Discussion of Related Art

Though training wheels are the most common means of allowing a novice to ride a bicycle, they do not achieve an effective balance training objective because their function is simply to transform an unstable bicycle into a stable quadricycle, not requiring any balancing effort on the part of the novice rider. Training wheels may even impede the sense of adequate sense of independent balance because the training wheels allow the novice to ride in an off-balance or tipped condition. The obvious advantage of training wheels is that their use does not require the participation of another person.

Parents and other trainers have long known that the most effective way to teach a novice the skill of balancing on a bicycle is to have the novice ride in two wheel mode while running along side and simultaneously providing physical support and oral advice and encouragement from the rear. In earlier days fathers would run along holding the bicycle upright by grasping the rearmost portion of the bicycle seat.

More recently, attachments and accessories for providing means for trainers, parents or mentors to hold, support, direct, guide and provide assurance and confidence to a bicycle rider trainee have been developed. These have taken the form of yokes, brackets, arms and poles with means of attachment to the rear of a bicycle. The attachments have handles or grips which allow the trainer to provide stabilizing and directing force to the bicycle. Some have adjustments which allow the grip to be positioned at a height or angle with respect to the bicycle frame and locked in place. Some have provided telescoping rigid sections, some of these with multiple holes for pin or bolt indexing of height or other position; some have incorporated remote braking facilities; Some are removable without the use of tools, though most require tools for installation and removal. Some are U-shaped, some linear.

2. Objects and Advantages

It is an object of the present invention to provide a training device for bicycles.

It is a further object of the invention to provide such a device which provides a selectable degree of controlling force to the bicycle.

It is a further object to provide such a device which will allow a non-rider mentor to achieve the same degree of teaching effectiveness and instill the same amount of confidence as a mentor who is a skilled rider.

It is a further object of the invention to provide such a device which is self adjusting, without the use of tools, to the most convenient and comfortable position for the trainer.

It is a further object of the invention to provide such a device which, while installed, can be instantly collapsed and expanded without tools so the bicycle on which it is installed can be used as a trainer by a novice rider at one time and as a standard bicycle by another, more skilled rider, for instance a novice's older sibling, at another time.

It is a further object to provide such a device which is low cost and easily manufactured and which is easy to install and remove so it can be easily transferred from one bicycle to another.

Further objects and advantages of the present invention will become apparent from a consideration of the drawings and the prior and following descriptive material.

BRIEF SUMMARY OF THE INVENTION

The present invention is a variable force balance assisting device for a bicycle. It comprises a tubular receiver means having means for substantially rigid attachment to the bicycle, a handle for imposing an external controlling and assisting force on the bicycle and an elongated spring-like element at one of its ends to the handle means and having its other end slidingly positioned within the receiver means, whereby force applied to the handle means is communicated through the flexible member to the receiver means and the bicycle.

BRIEF DESCRIPTION OF THE FIGURES

FIG. 1 is a representation of the simplest form of the U-shaped bicycle stabilizer.

FIG. 2 is an isometric view of the preferred form of the invention having a springed element.

FIG. 3 shows the structure of FIG. 2 installed on the rear fork of a bicycle.

DETAILED DESCRIPTION OF THE INVENTION

Referring now to the drawings, wherein like references are used to indicate like elements, there is shown in FIG. 3 a rear portion of a bicycle having rear wheel 56, including rim and tire. The wheel is supported from its hub by spokes 58. The hub rides on shaft 60. Shaft 60 traverses the pair of axle support members 54, also known as 'drop-outs' because they are frequently made with U-shaped slots to allow the rear wheel/axle assembly to 'drop out' of the frame when the axle nuts are loosened. Attached to and supporting the drop-outs 54 are main frame portions comprising the substantially horizontal chain stays 50 and the near vertical seat stays 52. The chain stays 50 connect the drop-outs 54 to the bottom bracket, not shown. The bottom bracket is the transverse tubular portion of the frame within which the crank axle rides and to which the two crank arms and pedals are attached. To one crank arm is fastened a 'chain-ring' or large cog for driving the chain. In turn the chain drives the rear wheel 56 by engaging a smaller rear cog or 'free-wheel' mounted on shaft 60, but not shown. The seat stays are welded or otherwise fastened to the top of the seat tube, not shown, which in turn supports the bicycle seat.

Referring now to FIG. 1, there is shown a representation in isometric perspective of the simplest form of the invention. A substantially rigid metallic tube is formed into a U-shape having a U-bend 14 which functions as a handle. The U-bend 14 has two ends 17 and 19 which, in FIG. 1 are each integral with one end of each of straight members 10 and 12. Straight members 10, 12 are substantially parallel. Their ends are flattened to form mounting pads 16. Mounting pads 16 are provided with smaller holes 20 for attachment to dropouts 54 at positions and with bolts usually employed for mounting training wheels, now removed. When both holes are employed for attachment to the dropouts, the entire U-shaped assembly is rigidly supported to the bicycle frame. In an alternate embodiment, the pads 16 are sprung apart and larger holes 21 are slipped over the ends of axle 60. The assembly is then held in place by an extra set of nuts, typically wing nuts, which are threaded onto axle 60 and tightened against pads 16.

In a preferred embodiment the balance assembly of FIG. 1 is formed of steel tubing having a total initial length of 60 inches (152 cm) and having a diameter of ¾ inches (1.9 cm) and a wall thickness of 0.049 inches (0.12 cm) In alternate embodiments of the invention, aluminum and plastic tubing are employed.

In use, the mentor runs or jogs alongside the novice rider on the bicycle while grasping the U-shaped handle 14 and applying corrective force as required to maintain the novice upright and to instill confidence. These corrective forces, applied only as necessary, create a bio-feedback interaction between the novice and the mentor thereby increasing the learning rate. A skilled and confident mentor, who is also a confident bicycle rider, instinctively adjusts the force applied to the handle 14 to provide the necessary bio-feedback and confidence without providing so much corrective force as to frighten the novice. By contrast, a non-rider who attempts the use of the assembly of FIG. 1, applies excessive force while trying to maintain the novice rider in a constant upright position, thereby suggesting to the novice that an unrealistic, perfectly upright, position is required for safe balance, and thereby frightening the novice and impeding the learning process.

The preferred embodiment of the present invention is shown in detail in FIG. 2 and shown installed on the rear of a bicycle in FIG. 3. In FIG. 2 there are shown two tubular receivers, a right hand receiver 64, and a left hand receiver 62, both of which have openings 31,33 at one end and have flattened and closed portions 16 at the other end. The flattening produces mounting tabs 16 into which two or more holes are provided. In the preferred embodiment there are three holes. Two of these, holes 20, have a smaller diameter for engaging the screws which had been provided for supporting the training wheels, now removed. The third hole 21 has a larger diameter sufficient to slide over axle 60 of FIG. 3. The tubing from which the tubular receivers are fabricated are of steel having an outside diameter of 0.750 inches (19 mm) and a wall thickness of 0.064 (1.6 mm) providing and inside diameter of 0.622 inches (15.8 mm). The overall length of the receivers 10, 12 is 18 inches (0.46 m). The tubular receivers 10,12 are designed and intended to be fastened to the rear frame portion of a bicycle as shown in FIG. 3. Other receiver lengths having other outside and inside diameters may be employed.

A U-bent handle 14 is provided for grasping by the mentor. Two straight tubular members 24,26 are attached to the ends of U-shaped handle 14. In the preferred embodiment these are formed from the same piece of tubing from which the U-shaped handle 14 is formed. Stiff springs 30 and 32 are securely fastened to the ends 25,27 of straight members 24,26 respectively. Springs 30,32 are close wound in tubular form of spring wire having a diameter of 0.049 inches (1.25 mm). The outside diameter of each tubular spring is 0.627 inches (15.9 mm) or about 0.005 inches (0.127 mm) greater in diameter than the inside diameter of the receivers. The slightly greater diameter of the springs than the bore of the receivers provides an interference fit which generates substantial resistance against accidental axial movement of the spring within the receiver while allowing the spring to be withdrawn or inserted upon the firm pressure of the mentor. In alternate embodiments the spring may be fabricated of a flexible strip of metal or plastic and the resistance against axial motion within the receiver generated by forming the strip in a sinusoidal or wavy pattern having a peak to peak distance slightly greater than the inside diameter of the receivers. In other embodiments of the invention, different receiver bores and different spring dimensions as well as different wire sizes may be employed.

When the U-shaped handle 14 is pushed firmly toward the receivers 62,64, the springs 30,32 followed by the straight parts 24,26 of the handle 14 are moved into and reside within the receivers 52,64. In this mode, maximum controlling force is available to the mentor. Further, in this mode, the stabilizer is unobtrusive and allows the bicycle to be employed by a skilled rider who does not need a mentor's assistance and, like an older sibling of the novice, might be embarrassed by the presence of an obvious training device.

As the novice rider gains confidence, experience and skill, the mentor withdraws straight members 24,26 from the receivers 62,64, thereby exposing a length of springs 30,32. The mentor selects the degree of correcting force she exerts on the novice's bicycle by exposing more or less length of springs 30,32. Withdrawing handle 14 and straight members 24,24 further from the receivers exposes a greater length of springs 30,32 and allows the mentor to exert less correcting force. Pushing some exposed spring back into the receivers 62,64 leaves less spring exposed and allows the mentor to exert greater correcting force.

In an alternate embodiment, the handle is formed of two half-U parts which, when joined, appear and act as a single U-shaped handle 14. The half-U parts are identified as right half-U 28 and left half-U 35. The right and left half-U parts are mechanically but separably joined by a pin 31 fastened securely to right hand part 28. The pin is inserted into a correspondingly sized cavity in left hand part 35.

In order to retain the handle ends 24,26 and their associated springs securely within the receivers 62,64, a latch pin 40 is provided on a straight part near the transition 17 from straight to U-shaped. A latch spring 42 is positioned on the corresponding receiver 62 and positioned near its open end 37. The latch spring is fastened to the receiver by any convenient means such as spot welding or riveting. A cut, not shown, is provided in the end of the receiver, positioned under the latch spring 42 to allow entry of the pin 40. A hole 44 is provided in the latch spring which engages latch pin 40 when the handle-spring assembly is fully engaged within the receivers.

In a further embodiment of the present invention, spring backed depressible button 66 has been provided near the end 27 of the straight portion of handle 14. Holes sized slightly larger in diameter than the diameter of button 66 are positioned in the wall of receiver 64 to accept the intrusion of button 66 when the handle assembly is pushed sufficiently far into the receiver for the button 66 to align with one of holes 68 positioned therein. With this construction, the handle 14 can be locked in any one of several positions and readily moved, without the use of tools, from one locked position to another, thereby allowing easy and positive adjustment of the position of the handle with respect to the receiver and therefore with respect to the bicycle.

In the alternate embodiment having the split handle 14, the mentor separates the left half-U from the right half-U and, depending on her left or right handedness, inserts the unwanted half-U and its spring 32 or 30 fully into its corresponding receiver. She then stabilizes the bicycle with the remaining half-U only and exposes the length of exposed spring 30,32 desired to provide the needed correcting force. As the novice rider approaches the independent riding skill level, less controlling and correcting force is required to be exerted by the mentor, and the split handle embodiment of the invention can be used for this purpose.

Referring again to FIG. 2, in an alternate embodiment the entire U-shaped assembly comprising handle 14, straight portions 24 and 26 and spring portions 30 and 32 are constructed from one long piece of flexible material such as a stiff coil spring bent into a U-shape.

From the foregoing description, it can be seen that the present invention comprises an advanced stabilizing assembly for a bicycle. It will be appreciated by those skilled in the art that changes could be made to the embodiments described in the foregoing description without departing from the broad inventive concept thereof. It is understood, therefore, that this invention is not limited to the particular embodiment or embodiments disclosed, but is intended to cover all modifications which are within the scope and spirit of the invention as defined by the appended claims.

I claim:

1. A variable force balance assisting device for a bicycle comprising first and second receiver means, each adapted for a substantially rigid attachment to the bicycle, each receiver means including a tubular element having an inside dimension, handle means for imposing an external controlling and assisting force on the bicycle, the handle means comprising a U-shaped handle part having first and second end parts, and flexible means connecting the handle means with the receiver means, the flexible means comprising first and second springs, each spring having an outside dimension which is larger than the inside dimension of either receiver means, the first spring being fastened to the first end part and slidingly positioned within the first tubular element, the second spring being fastened to the second end part and slidingly positioned within the second tubular element, whereby sliding motion of the springs within the receiver is impeded and force applied to the handle part is communicated through the springs to the receiver means and to the bicycle.

2. A variable force balance assisting device for bicycles as recited in claim 1 further providing that the handle part and the first and second springs are constructed of a single flexible element bent into a U-shape.

3. A variable force balance assisting device for bicycles as recited in claim 1 further providing that the U-shaped handle part is formed of two separable handle elements comprising a first handle element including the first end part and a second handle element including the second end part, whereby force applied to a handle element is communicated through its associated spring to the bicycle.

4. A variable force assisting device for bicycles comprising receiver means for providing a substantially rigid attachment to the bicycle and a fixed relationship with respect to the bicycle, the receiver means comprising a tubular element having an inside dimension, handle means for imposing an external controlling and assisting force on the bicycle, the handle means comprising a handle part and an end part, and flexible means connecting the handle means with the receiver means, the flexible means comprising a spring fastened to the end part of the handle means and slidingly positioned within the tubular element, the spring having an outside dimension which is larger than the inside dimension of the tubular element.

* * * * *